March 15, 1966 W. S. JARNAGIN 3,240,866

SELF-REPAIR CIRCUIT APPARATUS

Filed Aug. 12, 1963

*INVENTOR.*
WILLIAM S. JARNAGIN
BY Roger W. Hensen
ATTORNEY 3,240,866
Patented Mar. 15, 1966

3,240,866

SELF-REPAIR CIRCUIT APPARATUS

William S. Jarnagin, Boston, Mass., assignor to Honeywell Inc., a corporation of Delaware Filed Aug. 12, 1963, Ser. No. 301,414
2 Claims. (Cl. 174—68.5)

This invention relates generally to interconnection techniques for electronic circuitry and more specifically to the use of a flexible outer covering attached to a semirigid electric conductor wherein the flexible outer covering is partially conductive.

There have been many instances in the past where failure of a conductor such as a wire or a conductive element on a printed circuit board has claimed the lives of many people since this conductor was an important element in the control of vehicles such as aircraft. The present invention in utilizing a flexible partially conductive covering over the regular semirigid conductive element provides some measure of conductivity in spite of the fact that the main conductive element is broken. In most cases the added resistance due to the fact that the electricity has to flow from one end of the broken conductor through the partially conductive covering and back to the other end of the broken conductor will not cause circuit malfunction.

It is therefore an object of this invention to provide interconnection apparatus which will minimize circuit failures.

Other advantages and objects of this invention will appear from a reading of the specification and appended claims along with the two figures in the drawing in which:

Figure 1:
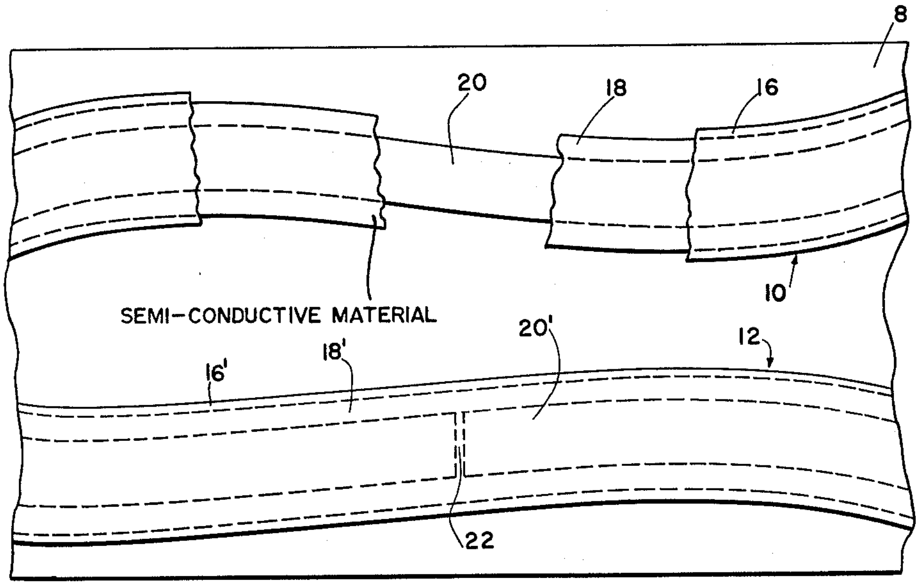
FIGURE 1 is a view of printed circuit conductors utilizing this invention.

Referring first to FIGURE 1, a base or printed circuit board 8 has attached thereto two conductive elements generally designated as 10 and 12. As will be realized this representation in FIGURE 1 is only a portion of the printed circuit board and is drawn for illustrative purposes only. The conductor 10 is broken away to depict an outer covering or insulation portion 16, an inner flexible conductive element 18 and the semirigid inner conductor 20. As mentioned, this drawing is for illustrative purposes only and it will be realized that the spacings and relative sizes are completely out of proportion and are shown for clarity. The conductive element 12 is shown as having a break 22 in an inner conductor 20' as is shown by the dashed lines representing this inner conductor.

While there are many conductors such as copper and aluminum which are somewhat flexible or as termed in this specification semirigid, they are still subject to breakage in some instances of vibration or other types of flexing. In spite of the tendency to break, these materials, such as copper, are chosen to provide a circuit electrical path in most instances due to the fact that they add very little resistance to the circuit between the various electrical devices requiring electrical power. Other substances which are more flexible are normally not as conductive and therefore cannot be used in a circuit because too much resistance is added to the electrical path between components. One example of these more flexible devices is rubber which is impregnated with silver particles. There have also been instances of nylon being treated to make it conductive. It will be realized by those skilled in the art that a very short, large cross-sectional piece of a material such as silver impregnated rubber in series with a long piece of copper will not have much effect on the total circuit resistance. From the above information it can be determined that the majority of the electrical current will flow from the left portion of conductor 20' until it gets to the break 22 in the conductor 20'. The majority of the current will go through the conductor 20', rather than partially conductive means 18', since the current will follow the path of least resistance in an inverse relationship where parallel paths are encountered. The break 22 in the conductor 20' is a high resistance path. Therefore, the current will flow out from the end of the left hand portion of conductor 20' into the surrounding conductive coating 18' and across the short gap 22 to the right hand portion of conductor 20'. Since this path will be very short due to the fact that the conductor 20' cannot move relative to the board 8, the added resistance to the electrical path will be extremely small.

When the break 22 occurs during operation of the circuit, all of the current will flow through the partially conductive coating 18'. This additional current will produce localized heating across this short path. With proper choice of materials, this heat will not be detrimental and in fact could be beneficial where the heat makes the partially conductive coating 18' more flexible and/or more conductive.

Figure 2:
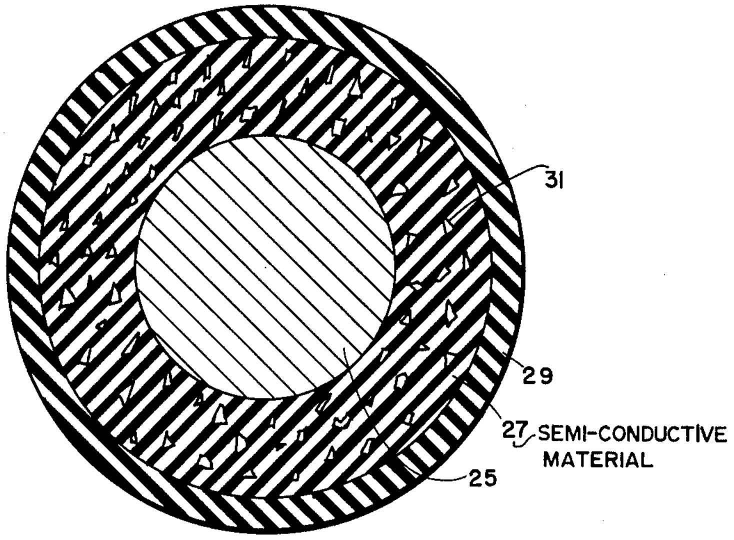
FIGURE 2 is a cross-section view of a wire utilizing the inventive concept.

FIGURE 2 illustrates a circular inner conductor 25 having a surrounding conductive flexible portion 27 and an outer insulative jacket 29. An attempt has been made to show conductive particles 31 embedded in the portion 27. It will be realized that sizes and spacing are not in proportion and are for illustrative purposes only. The basic idea of using a conductive jacket around a more conductive electrical conductor is also applicable to free hanging wires since the more flexible conductive material such as 27 can be used to keep the wire 25 from separating so far that a detrimental amount of added resistance is inserted into the circuit. Of course the insulative jacket 29 will not always be required and is only shown to illustrate that if the conductive characteristics of flexible material 27 is or can be detrimental to other portions of the electrical apparatus, insulation can be used to prevent these detrimental effects.

While I have shown the use of this invention on a wire and as a portion of a printed circuit board, I do not wish to be limited to these two illustrations. Further, in showing the insulations 16 and 29, I do not wish to be limited to having insulation over the flexible conductive portion of each use of the inventive concept. The partially conductive flexible coating or covering such as 18 is shown in continuous electrical contact with the semirigid conductor 20. Although the disclosed configuration will provide the least added resistance upon occurrence of breaks, the partially conductive flexible coating can be electrically connected to the semirigid conductor at appropriate points for specific applications where more resistance is not detrimental. I define the inventive concept as the use of a flexible conductive covering attached to a more rigid but more conductive main conductor or element whereby circuit or electrical continuity is still maintained after the breakage of the main conductor. I intend to include all the normally accepted flexible compositions which are conductive or which can be made conductive as variations of the material 18 and 27 shown and described and wish to be limited only by the appended claims.

I claim:

1. Printed circuit apparatus of the class described comprising, in combination:

- insulative substrate means;
- semirigid, printed conductor means directly attached to said base means;
- flexible covering means attached to and overlying said printed conductor means, said flexible covering means being impregnated with conductive particles for electrical conductivity through said covering means, and the covering means providing an electrical path between ends of broken portions of said printed conductor means; and insulating means attached to and overlying said flexible covering means.

2. Printed circuit apparatus wherein operation is impaired when electrical circuit paths break comprising, in combination:

insulative base means;

printed conductor means attached to said base means; and flexible covering means unitary with and covering said printed conductor means, said flexible covering means having conductive particles impregnated therein for electrical conductivity through said covering means, and the covering means providing an electrical path between ends of broken portions of said printed conductor means.

References Cited by the Examiner

UNITED STATES PATENTS

| | | | |
|---|---|---|---|
| 2,575,987 | 11/1951 | York et al. | 174—126 |
| 2,981,788 | 4/1961 | Burnish | 174—115 |
| 3,100,136 | 8/1963 | D'Ascoli et al. | 174—127 X |

ROBERT K. SCHAEFER, *Primary Examiner.*

DARRELL L. CLAY, *Examiner.*